United States Patent [19]

Neglia et al.

[11] Patent Number: 4,857,926
[45] Date of Patent: Aug. 15, 1989

[54] PHASE-RESPONSIVE ANGULAR TRACKING DEVICE

[75] Inventors: Joseph D. Neglia, Phoenix; David C. Cunningham, Carefree, both of Ariz.

[73] Assignee: Honeywell Inc., Minneapolis, Minn.

[21] Appl. No.: 89,279

[22] Filed: Aug. 25, 1987

[51] Int. Cl.$^4$ .............................................. H03M 1/64
[52] U.S. Cl. .................... 341/116; 341/112; 341/114; 318/656; 318/661
[58] Field of Search ............... 340/347 SY, 347 M; 318/660, 661, 656; 341/111, 112, 113, 114, 115, 116, 117

[56] References Cited

U.S. PATENT DOCUMENTS

| | | | |
|---|---|---|---|
| 3,634,838 | 1/1972 | Granqvist | 340/347 SY X |
| 3,914,760 | 10/1975 | Logue | 340/347 AD |
| 4,119,958 | 10/1978 | Simon et al. | 340/347 SY |
| 4,449,117 | 5/1984 | Fortescue | 340/347 SY |

OTHER PUBLICATIONS

The Engineering Staff of Analog Devices, Inc., Synchro and Resolver Conversion, 1980, pp. 43–51. *Identified as the "Boyes Textbook"*.
The Engineering Staff of Analog Devices, Inc., Analog–Digital Conversion Handbook, 6/1972, pp. I-61 to I-64.
"Inductosyn Precision Linear & Rotary Position Transducers", Farrand controls, Valhalla, NY (undated) (8pp).
Gasking, J. "Resolver-to-Digital Conversion Alternative to Optical Shaft Encoders", Motion, Jan./Feb. 1986, (20–23).
Resolver-to-Digital/Tachometer Converter, Series TACH-12, Control Sciences Inc., Chatsworth, CA, Aug. 1985, (6pp).

*Primary Examiner*—William M. Shoop, Jr.
*Assistant Examiner*—Brian K. Young
*Attorney, Agent, or Firm*—Arnold L. Albin

[57] ABSTRACT

An apparatus for generating phase modulated angular positional signals in digital form. A phase tracking loop receives a phase modulated signal from the rotor of a resolver whose stator windings are excited in quadrature. The phase output of the resolver is proportional to the angular displacement of the rotor. Signals for exciting the stator windings of the resolver are applied in phase quadrature to a phase detector to develop an analog error signal when combined with the rotor output signal. The analog phase error signal provides an output indicative of the angular displacement of the rotor. The error signal is applied to a voltage controlled oscillator, converted to digital form, and combined with the excitation signals in a closed loop to force the error signal to a null, whereupon the indicated digital output angle is in coincidence with the angular displacement of the rotor shaft.

13 Claims, 2 Drawing Sheets

PHASE-RESPONSIVE ANGULAR TRACKING DEVICE

BACKGROUND OF THE INVENTION

1. Field of the Invention

The invention relates generally to angular measuring systems, and more particularly to a phase-analog detector for providing a digital readout indicative of the angular displacement of a rotary inductive sensor.

2. Description of the Prior Art

Accurate measurement of angular displacement is currently required in many military, aerospace, satellite, radar and fire control systems, where the electrical output signals are required to drive numerical readout displays, provide servo loop feedback signals, and generate computer input data. Among the methods which have found wide application for precise angular measurements are optical encoders, which, for example, may have a pattern impressed upon a disk which is used in conjunction with a light source and a sensor to provide a digital output that is generated when the disk is rotated. Very high resolutions and accuracies are available, but such devices are prohibitively expensive and lack sufficient ruggedness in many applications.

A second approach is the use of a resolver, which is a rotating transformer which provides output analog voltages that are uniquely related to the input shaft angle. Such a resolver is comprised of two orthogonal stator windings and a rotor which is coupled to the input shaft. It provides an absolute indication of position from 0° to 360° of rotation. Two or more resolvers, each yielding data over a unique but limited range, may have their outputs combined in a multi-resolver configuration to yield an absolute indication of greater resolution through 360° of rotation. A resolver is a robust mechanical device that can be exposed to extreme environments without damage or loss of accuracy. As a transformer device, it provides signal isolation and a common-mode rejection to electrical interference. Since it is an analog device, only four wires are necessary for angular data transmission.

Transducers are also available which operate on the principles of inductive or capacitive coupling between conductive patterns bonded to a rigid substrate. Since, as in the resolver, there are no contacting elements except for slip rings, they provide high reliability and maintain original accuracy indefinitely. One such device is the INDUCTOSYN® position transducer. These transducers are available in both linear and rotary form for a wide range of applications. The term "resolver" is defined herein to include conventional resolvers, inductive and capacitive transducers, and similar devices.

Two methods have been used with a resolver to obtain output voltages proportional to the shaft angle. In the first method, an alternating current is applied to excite the rotor winding and outputs are taken from the two stator windings. Since the stator windings are orthogonally disposed, the output signal amplitudes are related by the trigonometric sine and cosine of the angular shaft displacement. Both stator output signals will have the same phase as the original excitation signal, while their amplitudes are modulated respectively by the sine and cosine functions as the shaft rotates. The ratio of the output amplitudes may then be compared to provide an output signal which provides a high degree of noise immunity. By applying the resultant signal to an amplitude tracking loop, the output may be made to follow automatically the input up to a specified maximum tracking rate. In this application the device is called a tracking converter.

In some systems, however, it is desired to produce a phase-modulated signal because it may conveniently be utilized for both rate and position control in a phase-locked loop. Thus the second method applies two signals in phase quadrature to the respective stator windings. The voltage induced in the rotor when the shaft is displaced angularly has a constant amplitude and frequency, but a phase varying with shaft angle. Thus, when the rotor windings are aligned with the first stator winding, the rotor output signal will be at 0° phase shift, while when the rotor windings align with the second stator winding, the output will be at a maximum of 90° phase shift. At angles between 0° and 90°, the phase of the output signal varies substantially linearly with the angle of displacement. As the rotor rotates through 360°, the phase of the output rotor signal also varies from 0° to 360° and back to 0°.

One technique for converting the phase-modulated signals into digital position data is known as the phase counting scheme, and is based on the direct measurement of phase angle by means of gating a counter with the phase-modulated position signal. Thus, a zero-crossing detector provides an output corresponding to an applied sinosoidal excitation signal and also to the zero-crossing of the rotor signal. The time interval between the two zero crossings is used to gate a pulse generator, which is applied to a counter to provide a digital readout. Because the phase output is sampled, and produces only one position measurement per excitation cycle, a low excitation frequency, such as 400 Hz, as used by many standard resolvers, results in a measurement delay as long as 2.5 ms. Moreover, since this reading also takes time to process, a delay of as much as 3.75 ms may result. This is not acceptable for many high-bandwidth position control servo loops, since these delay variations are a destabilizing influence on the control loop. Further since only one measurement is made per excitation cycle, the resolution of the converter is limited by the frequency of the excitation signal, and the accuracy is limited by the accuracy of the zero-crossing detector.

The present invention provides improved performance by utilizing the stability obtained in state of the art frequency synthesizers to generate highly accurate and stable frequency independent phase-tracking signals to provide a digital output corresponding to the angle of rotation of a resolver. It provides an apparatus for measuring angular displacement by continuously tracking the input signal and applying the phase modulated output derived from the rotor of a resolver whose stator windings are excited in quadrature to a phase tracking loop, and provides a digitized output. It affords high accuracy with minimal measurement delays. Measurement accuracy is independent of excitation frequency and less sensitive to incoherent noise sources.

SUMMARY OF THE INVENTION

The present invention provides an apparatus for generating a digital signal proportional to an angular displacement of a shaft. In a preferred embodiment, first and second signals in phase quadrature relationship are applied to excite a transducer coupled to the shaft. A third signal providing a phase difference proportional to an angular displacement of the shaft is generated by the transducer. The first, second, and third signals are combined to provide a difference signal, wherein the difference signal is indicative of an error between the angular displacement and a digital indication thereof. The difference signal is then applied in a closed loop to the first and second signals, whereby the difference signal is urged to a null value. When the difference signal has reached a null value, the digital indication corresponds to the angular displacement of the sensor rotor.

DESCRIPTION OF THE PREFERRED EMBODIMENT

Figure 1:
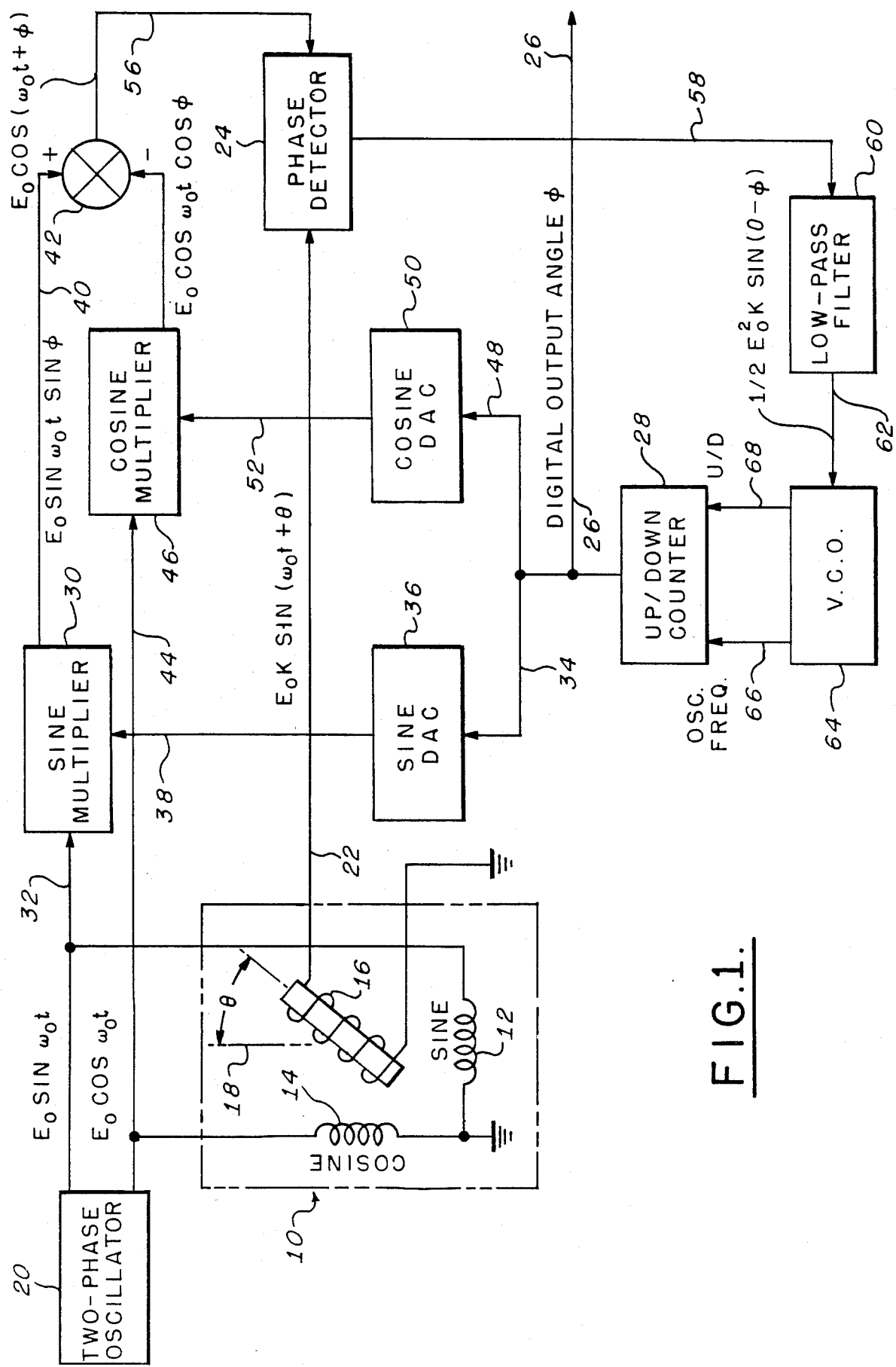
FIG. 1 is a functional block diagram of the present invention.
Figure 4:
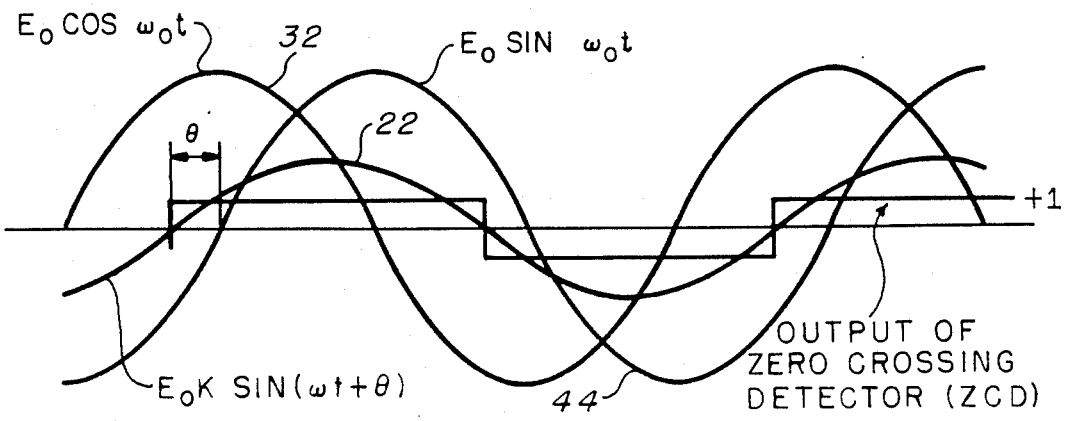
FIG. 4 shows sine and cosine waveforms useful in understanding the principles of the present invention.

Referring now to FIG. 1, resolver 10 is comprised of stator windings 12 and 14 and a rotor 16. The rotor 16 is shown displaced at an angle $\theta$ from a reference axis 18. An oscillator 20 generates sine and cosine waveforms which are used to excite the respective stator windings. A first excitation signal $E_o \sin \omega_o t$ is applied to excite a first stator winding 12. A second excitation signal, $E_o \cos \omega_o t$ is applied to winding 14 in quadrature to the signal applied to winding 12. FIG. 4 shows the phase relationship of the waveforms applied to the respective windings. These waveforms are applied at an angular frequency $\omega_0$ consistent with the type of sensor. Typically, resolvers operate in a frequency range up to 400 Hz, while inductive and capacitive sensors may operate from 2.5 KHz to as high as 100 KHz. Since the resolver acts as a transformer, the winding ratio may be represented by the coupling coefficient K. The coupling coefficient K is modulated by the mechanical displacement of the rotor and the resulting output signal 22 is a constant amplitude signal that undergoes a continuous phase shift of 360° for each complete rotation of the rotor. The phase-shifted signal is then converted to digital form by a phase tracking loop in a manner to be described. It will be clear to one skilled in the art that the resolver output may be coupled through slip rings or a rotary transformer to allow 360° rotation of the rotor. Similarly, an amplifier may be applied to the rotor output to improve the signal-to-noise ratio when the output must be transmitted over an appreciable distance.

The rotor output 22 is applied to one input of a phase detector 24. Phase detector 24 is also supplied with a second input signal on line 56 proportional to a digital output angle $\phi$ generated by the signal on line 26. The value of the input angle $\theta$ is combined with the signal on line 56 proportional to digital output angle $\phi$ to generate an error signal on line 58 which is applied via VCO 64 to counter 28. When the difference between the input angle $\theta$ and the feedback angle $\phi$ is zero, then the digital output angle generated by the up/down counter 28 is equal to the resolver input angle $\theta$. To generate the difference signal, $E_o \cos(\omega bt + \phi)$ on line 56, certain trigonometric functions must be performed by the system. Thus, sine multiplier 30 receives a sine signal on line 32 from oscillator 20. Counter 28 provides a digital output signal representative of the digital output angle $\phi$ on line 34 to the sine digital-to-analog converter 36. The analog sine output thereof is coupled on line 38 to a second input of sine multiplier 30. The product $E_o \sin \omega_o t \sin \phi$ of multiplier 30 appears on line 40 as one input to summing junction 42. In a similar manner, a quadrature signal $E_o \cos \omega_o t$ on line 44 generated by oscillator 20 is applied to cosine multiplier 46. Counter 28 furnishes a signal representative of the digital output angle $\phi$ on line 48 to cosine digital to analog converter 50. The analog output of converter 50 is then couple on line 52 to cosine multiplier 46. The output $E_o \cos \omega_o t \cos \phi$ thereof is applied on line 54 to a second input of junction 42. The difference of the signals applied to summing junction 42 appears on line 56, where it is seen to be a function of the digital output angle $\phi$ and is applied to phase detector 24.

Phase detector 24 effectively multiplies the two inputs on lines 22 and 56 to generate a product that has a first term proportional to the excitation frequency and a second term proportional to the difference between the angular displacement of the rotor and the indicated digital output angle. The difference output on line 58 is passed through a filter 60 which removes the excitation frequency and also acts an an integrator. The output of filter 60, which is a function of the sine of the difference angle, is numerically equal to the difference angle for small angles. Thus, the difference signal is an analog representation of the error between the rotor input angle $\theta$ and the digital output angle $\phi$. This signal is applied to a conventional voltage controlled oscillator (VCO) 64. VCO 64 generates an output frequency proportional to the magnitude of the error signal on line 66 and an up/down command on line 68 in accordance with the polarity of the error signal on line 62. Counter 28 receives the signals on lines 66 and 68 to generate a corresponding binary output representative of the digital output angle $\phi$. In a conventional manner, the angle stored in counter 28 drives the error signal on line 56 in closed loop fashion until the error signal is urged to zero, whereupon the digital output angle $\phi$ is equal to the analog input angle $\theta$ of the rotor.

The two-phase oscillator 20 may be generated in a variety of conventional manners. For example, the quadrature signals may be generated from the primary signal by means of a 90° phase shift circuit. Alternatively, two square-wave oscillators may be appropriately synchronized and the outputs filtered to provide a sine wave. Sine multiplier 30 and cosine multiplier 46 are available as conventional integrated circuit elements, such as Analog Devices part number AD534L. Analog Devices part number DAC71, a 16-bit D/A converter, in combination with Analog Devices part number AD639, an analog to sin/cos converter, is suitable for sine DAC 36 and cosine DAC 50. Alternatively, elements 30, 46, 36, and 50 are available in the form of a dual sin/cos multiplying D/A converter, such as Natel part number HDSC2036.

Up/down counter 28 may be any suitable integrated circuit, such as Texas Instruments part number SN54AS867. The voltage controlled oscillator 64 may be comprised of a VCO, part number AD650, as manufactured by Analog Devices, to provide the frequency output on line 66, and a zero-crossing detector, which may be a comparator, such as National Semiconductor part number LM319, or a conventional operational amplifier, such as National Semiconductor part number LF155, configured as a voltage comparator, referenced to ground potential, to provide the up/down control signal.

Figure 2:
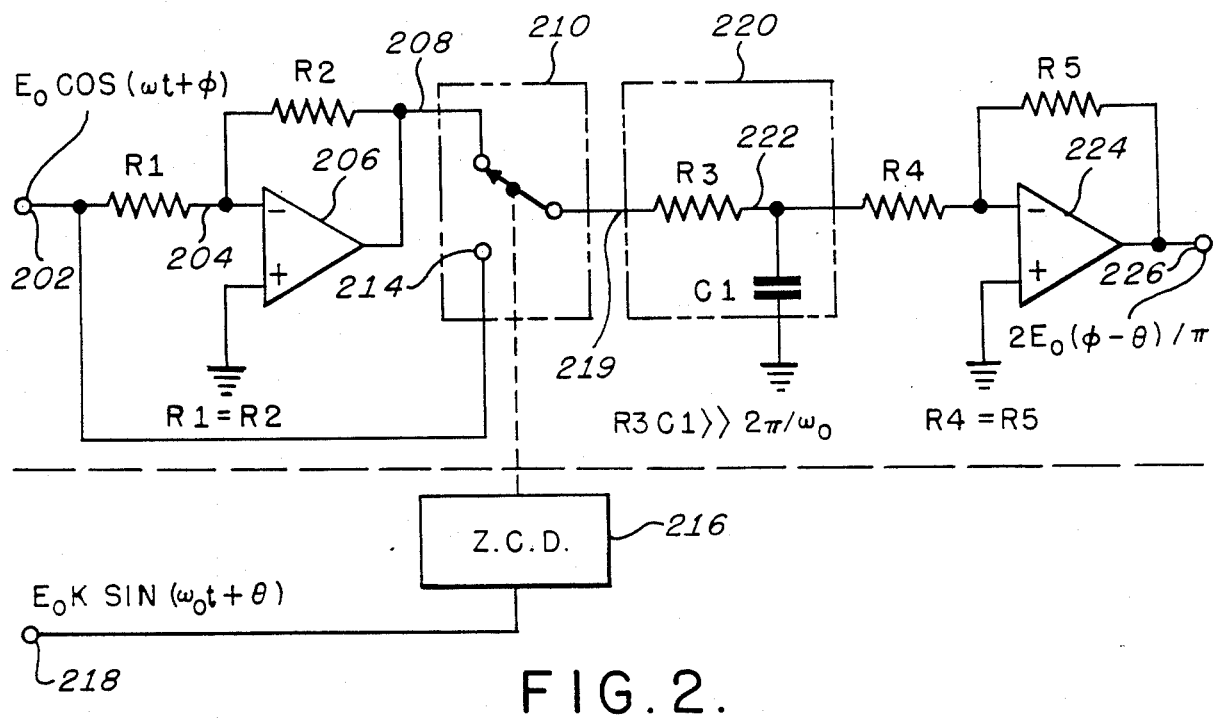
FIG. 2 is a block diagram showing the structure of a phase detector of the present invention.

Details of one configuration of the phase detector 24 are shown in FIG. 2. A first input signal $E_o \cos(\omega_0 t + \phi)$ applied to input 202 is coupled on line 204 to an operational amplifier 206 configured as an inverting amplifier. Resistors R1 and R2 determine the gain of the amplifier. The output of amplifier 206 is coupled to a first input 208 of an analog switch 210; such as Harris part number HI 1-0305-2. Signal 202 is further coupled on line 212 to a second input 214 of analog switch 210. Switch 210 is activated by a zero-crossing detector 216 when energized by a signal $E_o K (\sin \omega_0 t + \theta)$ applied at input 218. The output of detector 216 is either a logic high or logic low, in accordance with the voltage level of the applied signal at input 218, which activates switch 210 accordingly between inputs 208 and 214. The output of switch 210 is applied on line 219 to low-pass filter 220. Filter 220 acts to attenuate the high frequency components resulting from the switching action of switch 210. Resistor R3 and capacitor C1 may be chosen in a conventional manner, and adapted to the excitation frequency. The output of filter 220 is a dc voltage proportional to the sine of the phase difference of the signals applied to the two input terminals of the phase detector as shown in FIG. 4. A further operational amplifier 224 is used to invert the signal input applied on line 222 and restore the output on line 226 to the original phase relationship. For small angles, the sine of the angle is approximately equal to the value of the angle. Thus, the output on line 226 is an analog value proportional to the phase difference of the input signals as the control loop approaches a null error condition.

Resolver-to-digital converters are commercially available in the form of hybrid circuits using integrated circuit chips. Suitable devices include series TACH-12, as manufactured by Control Sciences Incorporated of Chatsworth, CA and part number IRDC 1732, manufactured by Analog Devices.

Figure 3:
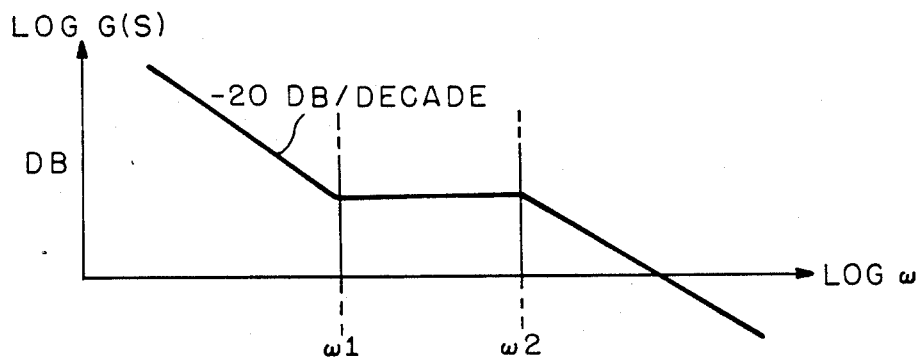
FIG. 3 is a graph in the frequency domain showing the attenuation response of a tracking filter.

Referring now to FIG. 3, filter 60 will be described. Filter 60 performs three primary functions in the phase tracking loop. Firstly, it removes any remaining undesirable high frequency components from the output of the phase detector. Secondly, it integrates the phase difference signal in such a way as to drive the error in the output angle $\phi$ to zero; and thirdly, it is designed to "tailor" the performance of the phase tracking loop. Thus, it will affect the tracking loop bandwidth (i.e., how fast the loop will respond to changes in its input), the amount of overshoot which will occur for a step change in input, the damping ratio (a measure of how quickly the overshoot and ringing due to input changes decay), and the stability of the loop. Preferably, the block takes the form of an integrator/lead combination, with a transfer function given by:

$$G(s) = K \frac{(s/\omega_1 + 1)}{s(s/\omega_2 + 1)} \tag{1}$$

the frequency response of which will have an asymptotic approximation as shown in the figure. This transfer function can be implemented with standard operational amplifiers, capacitors, and resistors.

FIG. 4 shows waveforms typical of the invention as described above, including the stator excitation signals 32 and 44, the rotor output signal 22, and the output signal 58 of the zero crossing detector. In operation, the two stator signals $E_o \sin \omega_0 t$ and $E_o \cos \omega_0 t$ are each amplitude modulated by the coupling coefficient K of the rotor angle $\theta$ and summed into the rotor. The rotor output is then $$E_o k \sin(\omega_0 t + \theta) \tag{2}$$

As shown in FIG. 1, the phase tracking loop operates by summing the two orthogonal excitation signals and the rotor signal and generates a digital number representing the displacement angle $\theta$. The oscillator quadrature signals on lines 32 and 44 are multiplied by the sine and cosine, respectively, of the current digital output angle $\theta$. This yields a signal $$E_o \sin(W_0 t) \sin(\phi) \tag{3}$$

and a second signal $$E_o \cos(\omega_0 t) \cos(\phi) \tag{4}$$

which are subtracted, yielding the carrier frequency phase modulated by the current output angle $\phi$:

$$E_o \cos(\omega_0 t + \phi) \tag{5}$$

This signal, on line 56, is applied to phase detector 24 and compared with the rotor output $\frac{1}{2}E_o^2 K[\sin(2\omega_0 t + \phi + \theta) + \sin(\theta - \phi)]$ on line 22. The phase detector effectively multiplies these two inputs to generate its output. Thus, the output is $$E_0^2 K \cos(\omega_0 t + \phi) \sin(\omega_0 t + \theta) \tag{6}$$

$$= (\tfrac{1}{2})E_0^2 K(\sin(2\omega_0 t + \phi + \theta) + \sin(\theta - \phi)) \tag{7}$$

The first term is at a frequency twice that of the excitation frequency, and will be filtered out by filter 60. The signal remaining is $$(\tfrac{1}{2})E_o^2 K \sin(\theta - \phi) \tag{8}$$

This signal is frequency compensated (in order to yield optimum loop behavior), and then drives VCO 64 to provide a pulse count to counter 28 until $\phi$, the angle held in the counter, drives the phase difference signal (8) to zero. When this occurs, $\phi$, the digital output angle, will be equal to $\theta$, the analog input angle, and the VCO control loop will be satisfied.

While the invention has been described in its preferred embodiment, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. A method for generating a digital signal indicative of an angular displacement of a shaft, comprising:
    providing a source of ac excitation at a predetermined frequency, for generating sinusoidal analog signals,
    applying ones of said analog signals in time quadrature to a transducer, said transducer having corresponding elements in space quadrature relationship,
    providing a sensor, coupled to said transducer elements, and having a rotor coupled to said shaft, for generating an analog rotor output signal having a phase shift with respect to said source of ac excitation proportional to said angular displacement, said sinusoidal analog signals being independent of said phase shift, algebraically combining said analog signals and said rotor output signal, to provide products of sines and products of cosines and derive an error signal representative of a difference thereof, and applying said combined signals to a bidirectional counter in a phase-lock loop to generate said digital signal whereby said error signal corresponds to differences between the angular displacement of the rotor and said digital signal indicative of said angular displacement, so that the value of said digital signal is urged to substantial identity with said analog rotor output signal.

2. Apparatus for indicating angular position of the rotor of a resolver having fixed windings, comprising:

a bidirectional counter for providing a digital signal representative of a reference angle, means responsive to said digital signal for providing signals representative of the sine and cosine of said reference angle, means fo providing sine and cosine signals at a predetermined excitation frequency independent of a phase parameter corresponding to said angular position, to respective first and second fixed windings of said resolver, means coupled to said rotor for providing a sinusoidal signal having a phase shift representative of the angular position of said rotor, first multiplication means for providing a first analog signal representative of the product of said sine of the reference angle and said phase angle independent sine signal applied to said resolver and a second analog signal representative of the product of said cosine of the reference angle and said phase angle independent cosine signal applied to said revolver, adder means for providing an algebraic difference of said first and second analog signals having a phase shift corresponding to said reference angle and independent of said phase parameter corresponding to said angular position, second multiplication means for providing a third analog signal comprised of the product of said phase shifted signal from said means coupled to said rotor corresponding to the sine of an angular position thereof and said algebraic difference, representative of a difference of said angular position and said reference angle, and phase-lock loop means for applying a portion of said third analog signal in closed loop fashion to said bidirectional counter so that said digital signal representative of a reference angle is urged to correspondence with a digital representation of said rotor angular position.

3. The apparatus as set forth in claim 2, said third analog signal further comprising first and second component signals, said first component signal proportional to an excitation frequency of said sine and cosine signals and said second component signal representative of a difference between said rotor position and said reference angle.

4. The apparatus as set forth in claim 3, wherein said first component signal is operative at a predetermined frequency greater than said second component signal.

5. The apparatus as set forth in claim 4, said filter means comprising low-pass filter means for rejecting said first component signal and for transmitting said second component signal.

6. The apparatus as set forth in claim 5, further comprising voltage controlled oscillator means, responsive to said second component signal, for providing an output frequency proportional to said analog difference signal.

7. The apparatus as set forth in claim 6, wherein said bidirectional counter is, responsive to said output frequency, for providing an output signal representative thereof, said output signal corresponding to said digital indication.

8. The apparatus as set forth in claim 7, said first multiplication means further comprising first trigonometric multiplier means, responsive to the sine of said signal corresponding to said digital representation and to said sine signal applied to said transducer for deriving a product thereof.

9. The apparatus as set forth in claim 8, further comprising second trigonometric multiplier means, responsive to the cosine of said signal corresponding to said digital representation and to said cosine signal applied to said transducer for deriving a product thereof.

10. The apparatus as set forth in claim 9, wherein said first and second trigonometric multiplier means are in phase quadrature.

11. The apparatus as set forth in claim 4, further comprising filter means responsive to said third analog signal for providing said second component signal, comprising said portion of said third analog signal, to said phase-lock loop means.

12. The apparatus as set forth in claim 11, wherein said second multiplication means comprises a phase detector having first and second inputs for providing an output representative of phase differences between signals applied to said inputs.

13. The apparatus as set forth in claim 12 wherein said rotor signal is generated by a rotary coupler, said coupler having first and second orthogonal elements fixed in space quadrature, coupled respectively to receive sine and cosine excitation signals, and a third element, axially rotatable with respect to said first and second elements, for providing said rotor signal when said third element is angularly displaced with respect to said first or second elements.

* * * * *